United States Patent [19]
Song et al.

[11] Patent Number: 6,043,971
[45] Date of Patent: Mar. 28, 2000

[54] ELECTROSTATIC DISCHARGE PROTECTION DEVICE FOR LIQUID CRYSTAL DISPLAY USING A COG PACKAGE

[75] Inventors: In-Duk Song; Jeong-Ki Park, both of Kumi-si, Rep. of Korea

[73] Assignee: L.G. Philips LCD Co., Ltd., Rep. of Korea

[21] Appl. No.: 09/185,700

[22] Filed: Nov. 4, 1998

[51] Int. Cl.[7] .................................................. G02F 1/1333
[52] U.S. Cl. ................................ 361/111; 361/54; 349/40
[58] Field of Search ........................ 361/111, 54; 349/40, 349/33; 257/355, 356; 327/310, 318; 326/82, 86

[56] References Cited

U.S. PATENT DOCUMENTS

| | | | |
|---|---|---|---|
| 5,233,448 | 8/1993 | Wu | 349/40 |
| 5,668,032 | 9/1997 | Holmberg et al. | 438/149 |
| 5,748,267 | 5/1998 | Natori et al. | 349/40 |
| 5,805,246 | 9/1998 | Lee et al. | 349/40 |
| 5,852,480 | 12/1998 | Yajima et al. | 349/40 |
| 5,926,234 | 7/1999 | Shiraki et al. | 349/40 |

*Primary Examiner*—Jeffrey Gaffin
*Assistant Examiner*—Kim Huynh
*Attorney, Agent, or Firm*—Long, Aldridge & Norman

[57] ABSTRACT

The electrostatic discharge (ESD) protection device for a liquid crystal display using a chip on glass (COG) package is provided. The ESD protection device includes a plurality of gate lines and data lines each of which has an output pad at its end. A plurality of gate line input pads and data line input pads are formed opposite to the output pads of the gate lines and data lines, respectively. A common electrode is formed between the plurality of gate line input pads and output pads and between the data line input pads and output pads. A plurality of electrostatic discharge protection circuits are connected between the input pads and the common electrodes to protect the input pads from electrostatic discharge.

22 Claims, 5 Drawing Sheets

ELECTROSTATIC DISCHARGE PROTECTION DEVICE FOR LIQUID CRYSTAL DISPLAY USING A COG PACKAGE

BACKGROUND OF THE INVENTION

1. Field of the Invention

The present invention relates to a liquid crystal display and, more particularly, to an electrostatic discharge protection device for a liquid crystal display using a chip on glass (COG) package, which protects the input pads of the display from electrostatic charge.

2. Discussion of Related Art

In a thin film transistor-liquid crystal display (TFT-LCD), packaging techniques for connecting a driving IC, which provides a driving signal to the LCD to the TFT-LCD panel, include wire bonding (WB), tape automated bonding (TAB) and chip on glass (COG) methods. In the WB method, the driving ICs are connected to the panel electrodes with Au wires. The TAB method mounts a package, in which the driving IC is connected to a film carrier, on the panel. Finally, the COG method forms a bump on a bare chip and mounts it on the panel in which inner and outer lead pads are formed.

During a TFT-LCD fabricating process, static electricity may be applied to the TFT-LCD, destroying its inner elements, such as a TFT. To prevent the damaging effect of the static electricity after forming the TFT-LCD array, a shorting bar is used to facilitate the inspection of the TFT-LCD array. The shorting bar structure consists of one shorting bar connected to each gate line of the TFT-LCD and another shorting bar connected to each data line. To check if the gate line is short-circuited during the array inspection, the power is applied to the shorting bar connected to each gate line and the opposite end of the gate line is checked. The data line is checked using the shorting bar in the same manner as the gate line.

The shorting bar is not used in actual driving of the TFT-LCD but used only for electrostatic discharge protection and array inspection. The shorting bar is then disconnected from the TFT-LCD array. That is, after the TFT-LCD array is fabricated and its inspection is completed, the upper and lower plates of the TFT-LCD are attached to each other and a scribe process and a grinding process are sequentially carried out. Thereafter, the shorting bar is disconnected. Meanwhile, it is difficult to form the shorting bar according to the packaging methods since the configurations of the gate lines and data lines depend on the packaging methods. In other words, with the TAB method, the carrier film is connected to both sides of the bare chip so that a space on the TFT-LCD panel can be secured. It allows the shorting bars to be formed on one side of the gate line pad and one side of the data line pad which are also the areas reserved for placing the driving ICs.

On the other hand, with the COG method, a space on the TFT-LCD panel is difficult to secure because the inner and outer leads must be formed on the driving IC mounting areas of the panel. Thus, the shorting bar cannot be formed on the driving IC mounting areas. To solve this problem, there has been developed a technique for forming the shorting bar on the TFT-LCD in COG package. This technique is explained below with reference to the attached drawings.

FIG. 1 is a layout of a conventional liquid crystal display in a COG package having a shorting bar. FIG. 2 is a layout of a conventional liquid crystal display in a COG package having an electrostatic discharge protecting circuit. Referring to FIG. 1, a plurality of gate lines 1 are arranged in one direction on a substrate at regular intervals, and a plurality of data lines 2 are arranged at regular intervals perpendicular to the gate lines 1. A gate line pad 3 and a data line pad 4 are formed at one end of each gate lines 1 and one end of each data line 2, respectively. A plurality of gate line input pads 7 are formed at regular intervals opposite to gate line pads 3, and a plurality of data line input pads 8 are arranged at regular intervals opposite to data line pads 4. The gate driving IC mounting area corresponds to the region of the gate line input pads 7, and data driving IC mounting area corresponds to the region of the data input pads 8.

First and second shorting bars 5 and 6 are formed on the gate driving IC mounting area 9 and the data driving IC mounting area 10, respectively. That is, a first shorting bar 5 is formed between the gate line pads 3 and gate input pads 7 and connected to each of the gate line pads 3. A second shorting bar 6 is formed between the data line pads 4 and the data input pads 8 and connected to each of the data line pads 4. Reference numeral 11 denotes a laser cutting line. After the TFT-LCD is constructed as above, which includes TFTs and pixel electrodes, an inspection of the array is performed, followed by the attachment of the upper and lower plates with respect to each other. Then, portions between shorting bars 5 and 6 and gate line pads 3 and data line pads 4 are cut using a laser cutting apparatus.

Referring to FIG. 2, the conventional TFT-LCD using a COG package, having an electrostatic discharge protection circuit, is constructed in such a manner that a plurality of gate lines 1 are arranged in one direction on a substrate at regular intervals, a plurality of data lines 2 are arranged at regular intervals perpendicular to the gate lines 1, and a common electrode 12 is formed around the TFT-LCD. A gate line pad 3 and data line pad 4 are formed at one end of each gate lines 1 and one end of each data line 2, respectively. A plurality of gate line input pads 7 are formed at regular intervals opposite to gate line pads 3, and a plurality of data input pads 8 are arranged at regular intervals opposite to the data line pads 4. Both ends of the gate line 1 and the data line 2 are connected to the common electrode 12 through an electrostatic discharge protection circuit 13. The gate driving IC mounting area corresponds to the region of the gate line input pads 7, and the data driving IC mounting area corresponds to the region of the data input pads 8. The common electrode 12 is connected to a common electrode (not shown) of the upper plate of the display using an Ag dot.

The conventional TFT-LCD in a COG package has the following problems. While the inner circuit of the TFT-LCD is protected from electrostatic discharge because either the shorting bar or the electrostatic discharge protection circuit is provided to the outer lead pad placed on the TFT-LCD array side, the input pads are all floating so that there is no path through which static electricity is discharged. Thus, the input pads are susceptible to and can be damaged by the electrostatic discharge. Furthermore, after ICs are attached to the input/output pads, static electricity generated from the ICs remains in the input pad, damaging the ICs with the electrostatic discharge.

SUMMARY OF THE INVENTION

Accordingly, the present invention is directed to an electrostatic discharge protection device for an LCD using a COG package that substantially obviates one or more of the problems due to limitations and disadvantages of the related art.

An object of the present invention is to provide an electrostatic discharge protection device for an LCD using a COG package, in which a common electrode line is formed on an IC mounting area and each input pad is connected to the common electrode through an electrostatic discharge protection circuit to protect the input pad and IC from the electrostatic discharge.

To achieve these and other advantages and in accordance with the purpose of the present invention, as embodied and broadly described, the electrostatic discharge protection device for a liquid crystal display using a COG package, includes: a plurality of gate lines and data lines each of which has an output pad at its end; a plurality of gate line input pads and data line input pads formed opposite to the output pads of the gate lines and data lines, respectively; a common electrode formed between the plurality of gate line input pads and output pads and between the data line input pads and output pads, the common electrode being formed in one body; and a plurality of electrostatic discharge protection circuits connected between the input pads and common electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Figure 1:
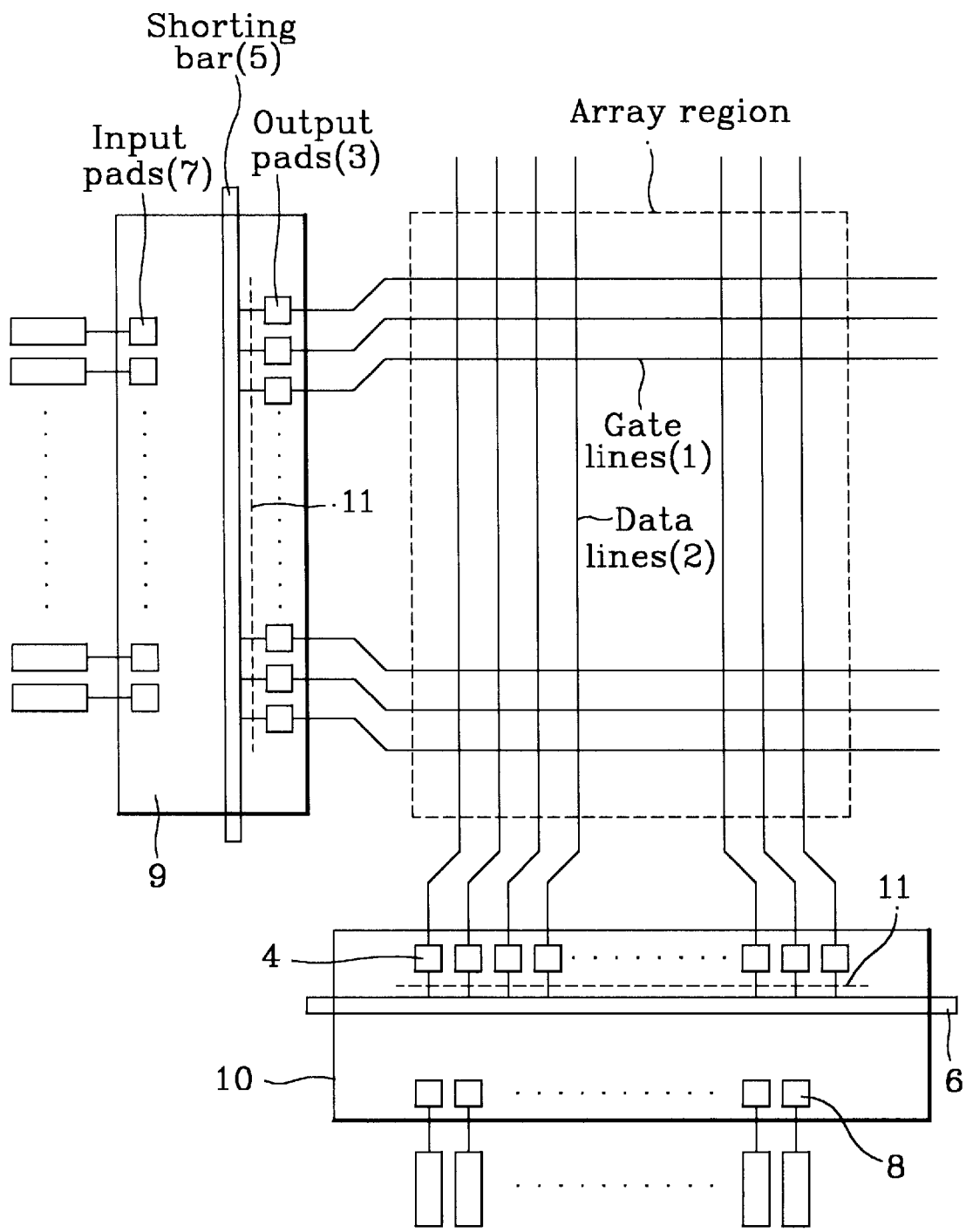
FIG. 1 is a layout of a conventional liquid crystal display using a COG package and having a shorting bar.
Figure 2:
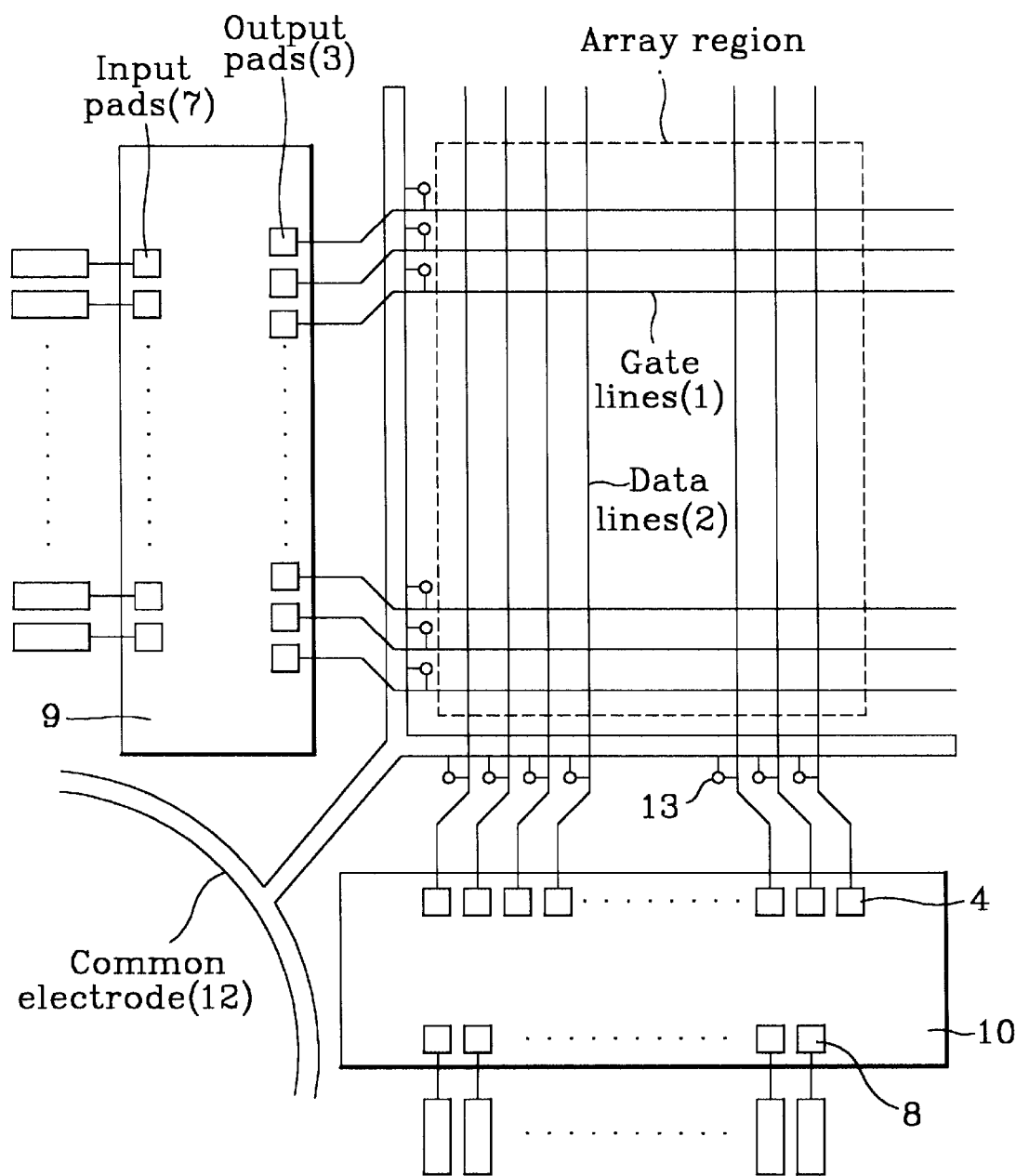
FIG. 2 is a layout of a conventional liquid crystal display using a COG package and having an electrostatic discharge protection circuit.
Figure 3:
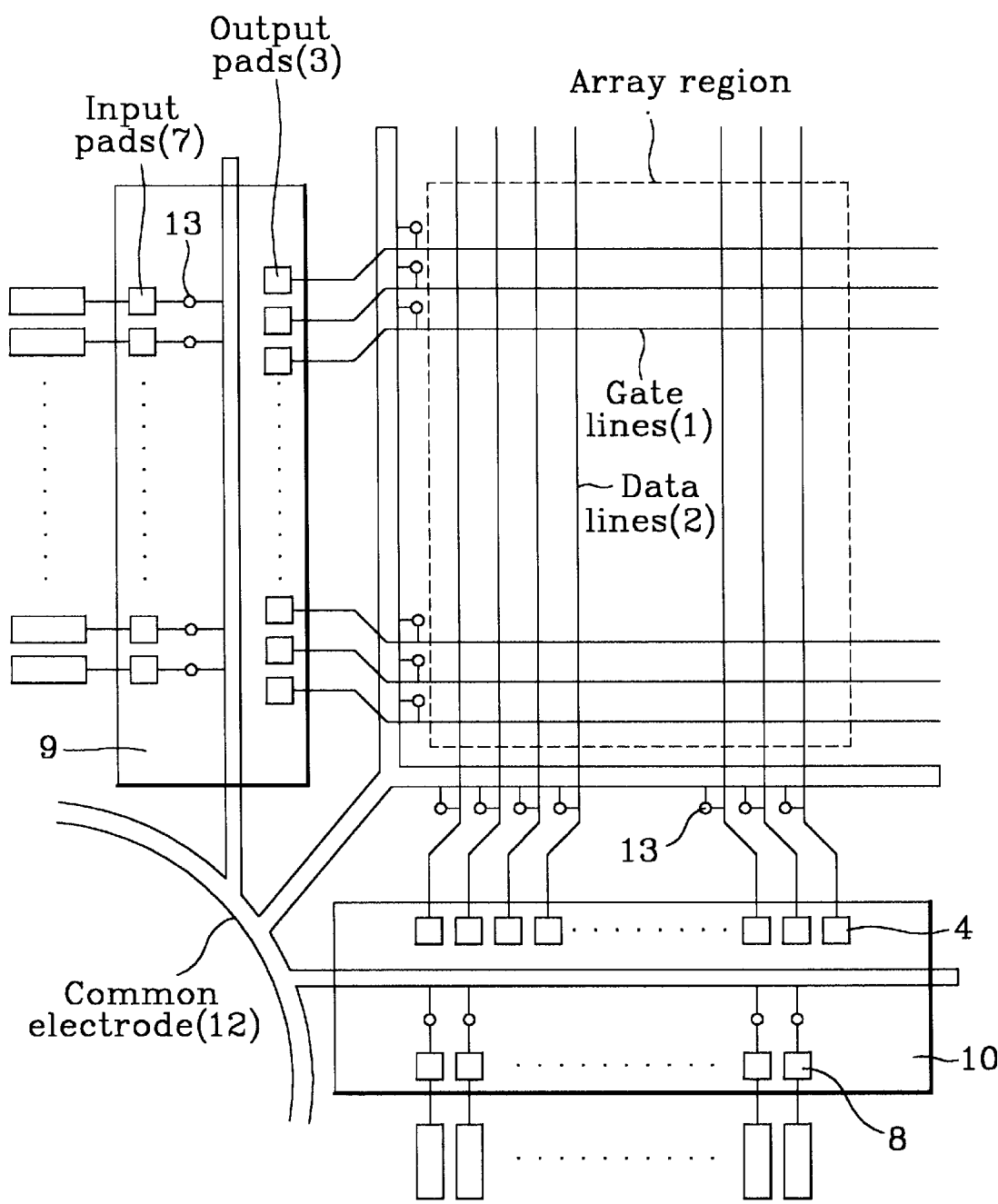
FIG. 3 is a layout of an electrostatic discharge protection device for a liquid crystal display in a COG package according to a first embodiment of the present invention.

FIG. 3 is a layout of an electrostatic discharge protection device of a TFT-LCD in a COG package according to a first embodiment of the present invention. Referring to FIG. 3, the TFT-LCD is constructed in such a manner that a plurality of gate lines 1 are arranged in one direction on a substrate at regular intervals, a plurality of data lines 2 are arranged at regular intervals perpendicular to the gate lines 1, and a common electrode 12 is formed around the TFT-LCD. A gate line output pad 3 and data line output pad 4 are formed at one end of each gate lines 1 and one end of each data line 2, respectively. A plurality of gate line input pads 7 are formed at regular intervals opposite to gate line input pads 3, and a plurality of data line input pads 8 are arranged at regular intervals opposite to data line output pads 4.

A gate driving IC mounting area 9 corresponds to the region for the gate line input pads 7, and the data driving IC mounting area 10 corresponds to the region for the data input pads 8. A common electrode 12 is formed on the gate driving IC mounting area 9 and the data driving IC mounting area 10. The common electrode 12, gate line input pads 7 and data line input pads 8 are connected to a plurality of electrostatic discharge protection circuits 13. Each one of the gate lines 1 and the data lines 2 is connected to the common electrode 12 placed around the TFT-LCD through the plurality of the electrostatic discharge protection circuits 13.

Figure 4:
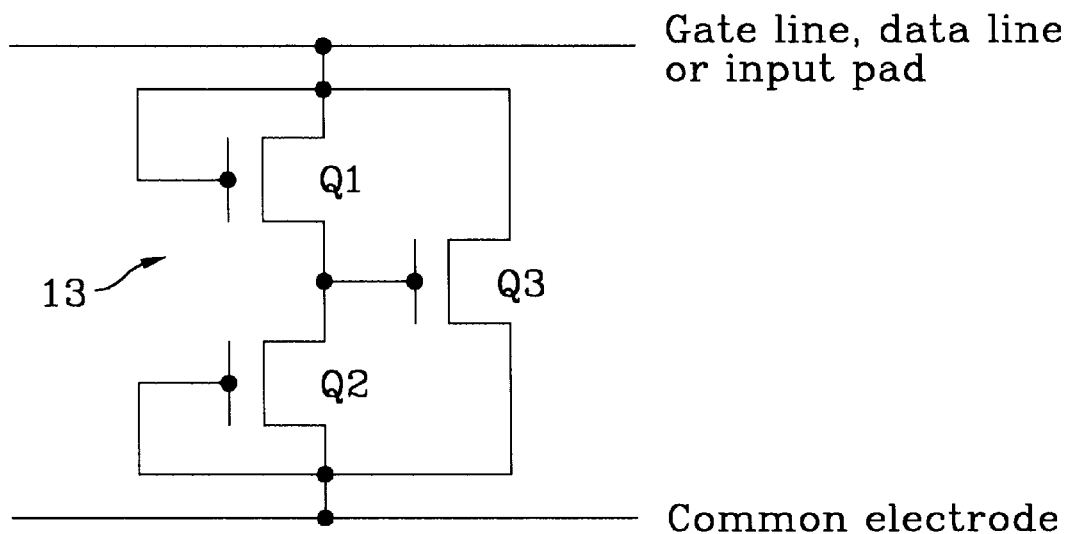
FIG. 4 is an electrostatic discharge protection circuit according to the present invention.

Referring to FIG. 4, each electrostatic discharge protection circuit has first and second transistors Q1 and Q2 serially connected between a gate line 1, a data line 2 or input cads 7 or 8 and the common electrode 12. The gate of a third transistor Q3 is connected to the contact point of the first and second transistors Q1 and Q2. The source and drain electrodes of the third transistor Q3 are connected to the gates of the first and second transistors Q1 and Q2, respectively. Each of the transistors constructing the electrostatic discharge protection circuit has the same structure as the TFT (not shown) of the TFT-LCD array, and fabricated by the same process as that of the TFT. Each one of the transistors in the electrostatic discharge circuit is preferably an NMOS-type transistor.

Figure 5:
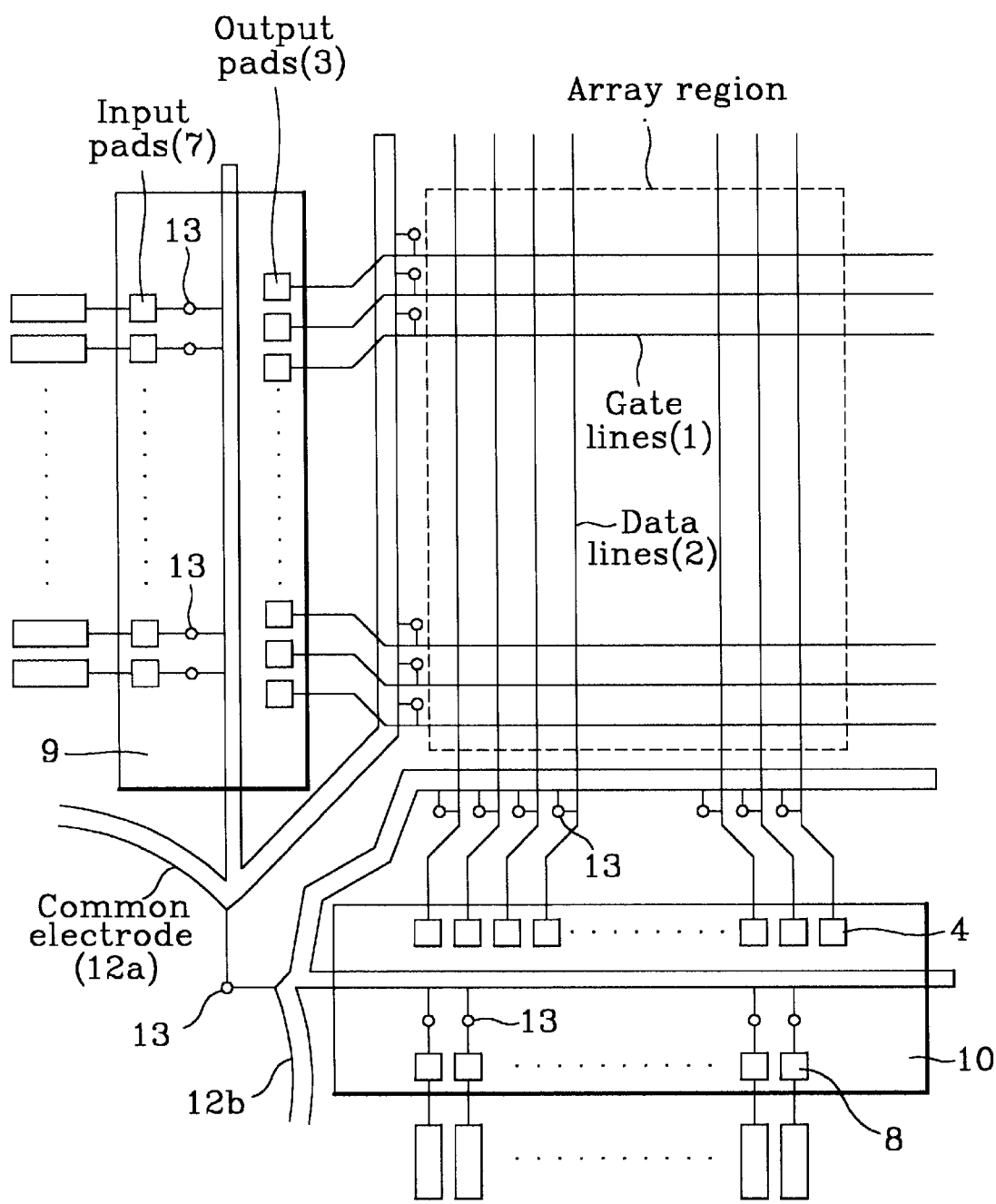
FIG. 5 is a layout of an electrostatic discharge protection device of a liquid crystal display in a COG package according to a second embodiment of the present invention.

FIG. 5 is a layout of an electrostatic discharge protection device for a liquid crystal display using a COG package according to a second embodiment of the present invention. Referring to FIG. 5, the TFT-LCD is constructed in such a manner that a plurality of gate lines 1 are arranged in one direction on a substrate at regular intervals, a plurality of data lines 2 are arranged at regular intervals perpendicular to the gate lines 1, and a common electrode 12 is formed around the TFT-LCD. A gate line output pad 3 and data line output pad 4 are formed at one end of each gate lines 1 and one end of each data line 2, respectively. A plurality of gate line input pads 7 are formed at regular intervals opposite to the gate line input pads 3, and a plurality of the data line input pads 8 are arranged at regular intervals opposite to data line output pads 4.

A gate driving IC mounting area 9 corresponds to the region for the gate line input pads 7, and the data driving IC mounting area 10 corresponds to the region for the data input loads 8. A first common electrode 12a is formed on the gate driving IC mounting area 9 and intersects gate lines 1 placed in the peripheral region of the TFT-LCD. A second common electrode 12b is formed on the data driving IC mounting area 10 and intersects the data lines 2 placed in the peripheral region of the TFT-LCD. A plurality of electrostatic discharge protection circuits 13 are connected between the first common electrode 12a and the gate line input pads 7 and the gate lines 1. Another plurality of electrostatic discharge protection circuits 13 are connected between the second common electrode 12b and the data input pads 8 and the data lines 2. First and second common electrodes 12a and 12b are connected to each other through an electrostatic discharge protection circuit 13. The electrostatic discharge protection circuit shown in FIG. 5 is identical to that of FIG. 4.

According to the present invention, the common electrode is formed on the IC mounting areas and connected to each input pad through the electrostatic discharge protection circuit, protecting the input pad of the TFT-LCD from electrostatic discharge. Moreover, a discharge path for discharging static electricity generated from the IC is also formed.

It will be apparent to those skilled in the art that various modifications and variations can be made in the electrostatic discharge protection device for a TFT-LCD using a COG package of the present invention without departing from the spirit or scope of the invention. Thus, it is intended that the present invention cover the modifications and variations of this invention provided they come within the scope of the appended claims and their equivalents.

What is claimed is:

1. An electrostatic discharge protection device for a liquid crystal display using a chip on glass package, the electrostatic discharge protection device comprising:
   a plurality of gate lines, each one of the plurality of gate lines having an output pad at one end;
   a plurality of data lines, each one of the plurality of data lines having an output pad at one end;
   a plurality of gate line input pads formed opposite to output pads of the gate lines;
   a plurality of data line input pads formed opposite to output pads of the data lines;
   a common electrode formed between the plurality of gate line input pads and the output pads of the gate lines and formed between the plurality of data line input pads and the output pads of the data lines; and
   a first plurality of electrostatic discharge protection circuits connected between the plurality of gate line input pads and the common electrode.

2. An electrostatic discharge protection device of claim 1, wherein the common electrode is spatially formed around a thin film transistor-liquid crystal display array having the plurality of gate lines and the plurality of data lines.

3. An electrostatic discharge protection device of claim 2, wherein the common electrode is connected to the plurality of gate lines through a second plurality of electrostatic discharge protection circuits.

4. An electrostatic discharge protection device of claim 3, wherein each one of the second plurality of electrostatic discharge protection circuit comprises first and second transistors serially connected between each one of the plurality of gate lines and the common electrode, and a third transistor having a gate connected between the first and second transistors and a source and a drain of the third transistor being connected to the gates of the first and second transistors, respectively.

5. An electrostatic discharge protection device of claim 2, wherein the common electrode is connected to the plurality of data lines through a third plurality of electrostatic discharge protection circuits.

6. An electrostatic discharge protection device of claim 1, wherein each electrostatic discharge protection circuit comprises first and second transistors serially connected between each one of the plurality of gate line input pads and the common electrode, and a third transistor having a gate connected between the first and second transistors and a source and a drain of the third transistor being connected to the gates of the first and second transistors, respectively.

7. An electrostatic discharge protection device of claim 1, wherein a fourth plurality of electrostatic discharge protection circuits are connected between the plurality of data line input pads and the common electrode.

8. An electrostatic discharge protection device or a liquid crystal display using a chip on glass package, the electrostatic discharge protection device comprising:
   a plurality of gate lines, each one of the plurality of gate lines having an output pad at one end;
   a plurality of data lines, each one of the plurality of data lines having an output pad at one end;
   a plurality of gate line input pads formed opposite to output pads of the gate lines;
   a plurality of data line input pads formed opposite to output pads of the data lines;
   a first common electrode formed between the plurality of gate line input pads and the output pads of the gate lines;
   a second common electrode formed between the plurality of data line input pads and the output pads of the data lines; and
   a plurality of electrostatic discharge protection circuits connected between the plurality of gate line input pads and the first common electrode and connected between the plurality of data line input pads and the second common electrode.

9. An electrostatic discharge protection device of claim 8, further comprising:
   a third common electrode connected to the first common electrode and intersects the plurality of gate lines; and
   a fourth common electrode connected to the second common electrode and intersects the plurality of data lines, wherein the third and fourth common electrodes are connected to the plurality of gate lines and plurality of data lines through the plurality of electrostatic discharge protection circuits.

10. An electrostatic discharge protection device of claim 9, wherein each electrostatic discharge protection circuit comprises first and second transistors serially connected and a third transistor having a gate connected between the first and second transistors and a source and a drain of the third transistor being connected to the gates of the first and second transistors, respectively.

11. An electrostatic discharge protection device of claim 9, wherein the third and fourth common electrodes are spatially formed around a thin film transistor-liquid crystal display array having the plurality of gate lines and the plurality of data lines.

12. An electrostatic discharge protection device of claim 8, wherein the first and second common electrodes are connected to each other through a electrostatic discharge protection circuit.

13. An electrostatic discharge protection device of claim 8, wherein each electrostatic discharge protection circuit comprises first and second transistors serially connected and a third transistor having a gate connected between the first and second transistors and a source and a drain of the third transistor being connected to the gates of the first and second transistors, respectively.

14. An electrostatic discharge protection device or a liquid crystal display using a chip on glass package, the electrostatic discharge protection device comprising:
   a gate line having an output pad formed on a first region;
   a data line having an output pad formed on a second region, the data line disposed substantially perpendicularly with respect to the gate line;
   a gate line input pad formed on the first region, wherein the gate line input pad corresponds to the output pad of the gate line;
   a data line input pad formed on the second region, wherein the data line input pad corresponds to the output pad of the data line;
   a first electrode disposed on the first region between the output pad of the gate line and the gate line input pad; and
   a first charge transfer circuit connected between the first electrode and the gate line input pad.

15. An electrostatic discharge protection device of claim 14, further comprising a second electrode disposed on the second region between the output pad of the data line and the data line input pad and a second charge transfer circuit connected between the second electrode and the data line input pad.

16. An electrostatic discharge protection device of claim 15, wherein the first charge transfer circuit comprises first and second transistors serially connected and a third transistor having a gate connected between the first and second transistors and a source and a drain of the third transistor being connected to the gates of the first and second transistors, respectively.

17. An electrostatic discharge protection device of claim 14, further comprising a third electrode disposed around an array having the gate line, wherein the third electrode is connected to the gate line through a third charge transfer circuit.

18. An electrostatic discharge protection device of claim 14, further comprising a fourth electrode disposed around an array having the data line, wherein the fourth electrode is connected to the data line through a fourth charge transfer circuit.

19. An electrostatic discharge protection device of claim 14, further comprising:

a second electrode disposed on the second region between the output pad of the data line and the data line input pad and a second charge transfer circuit connected between the second electrode and the data line input pad;

a third electrode disposed around an array having the gate line, wherein the third electrode is connected to the gate line through a third charge transfer circuit; and a fourth electrode disposed around an array having the data line, wherein the fourth electrode is connected to the data line through a fourth charge transfer circuit.

20. An electrostatic discharge protection device of claim 19, wherein the first, second, third, fourth electrodes are connected to each other.

21. An electrostatic discharge protection device of claim 19, wherein the first and second electrodes are connected to each other through a fifth charge transfer circuit.

22. An electrostatic discharge protection device of claim 14, wherein the first charge transfer circuit comprises first and second transistors serially connected and a third transistor having a gate connected between the first and second transistors and a source and a drain of the third transistor being connected to the gates of the first and second transistors, respectively.

* * * * *